United States Patent [19]

Kyo et al.

[11] 4,258,154

[45] Mar. 24, 1981

[54] AROMATIC POLYESTER

[75] Inventors: Kayomon Kyo, Kyoto; Nakaba Asahara; Yasuhiko Asai, both of Uji; Isamu Hirose, Kyoto; Sadao Kato, Uji, all of Japan

[73] Assignee: Unitika Ltd., Amagasaki, Japan

[21] Appl. No.: 49,025

[22] Filed: Jun. 15, 1979

[30] Foreign Application Priority Data

Jun. 15, 1978 [JP] Japan .................. 53-72774

[51] Int. Cl.$^3$ ................. C08L 77/00; C08L 67/00
[52] U.S. Cl. ................. 525/425; 260/40 R; 525/132
[58] Field of Search ................. 525/425

[56] References Cited

U.S. PATENT DOCUMENTS

| | | | |
|---|---|---|---|
| 4,052,481 | 10/1977 | Asahara | 525/425 |
| 4,171,330 | 10/1979 | Kyo et al. | 525/425 |

FOREIGN PATENT DOCUMENTS

| | | | |
|---|---|---|---|
| 50-4146 | 1/1975 | Japan | 525/425 |
| 52-15292 | 8/1977 | Japan . | |

OTHER PUBLICATIONS

Abstract of 78-63868, 12/78, Japan, Unitika.

*Primary Examiner*—Paul Lieberman
*Attorney, Agent, or Firm*—Sughrue, Rothwell, Mion, Zinn and Macpeak

[57] ABSTRACT

A resin composition consisting essentially of (A) an aromatic polyester-polycarboxylic anhydride and (B) a polyamide. An article molded from the resin composition exhibits high heat resistance, mechanical properties and moldability. It is particularly resistant to cracking upon impact and is also resistant to breaking at a thin-walled portion.

22 Claims, 4 Drawing Figures

AROMATIC POLYESTER

BACKGROUND OF THE INVENTION

1. Field of the Invention

This invention relates to a resin composition with improved mechanical characteristics, and more particularly to a resin composition with improved mechanical characteristics that comprises an aromatic polyester-polycarboxylic anhydride and a polyamide.

2. Description of the Prior Art

An aromatic polyester copolymer (hereinafter, referred to as APE) prepared from aromatic dicarboxylic acid or functional derivatives thereof and a diphenol or functional derivatives thereof is a heat resistant, thermoplastic resin having high heat distortion temperature and high heat decomposition temperature as well as good mechanical and electrical properties. It is widely used in fields where engineering plastics of high quality are required. However, because of its high heat distortion temperature, it is less moldable than other thermoplastic resins; for instance, making an injection molded article of it requires high molding temperature and injection pressure whereas the resulting molded article often develops a sink mark, flow mark or excessive internal strains.

Molded articles with sink marks, flow marks or excessive internal strains are not only poor in appearance but are greatly modified in mechanical properties so it frequently occurs that the excellent performance of the resin from which they are molded will not be exhibited to the fullest. Depending on the kind of molded article, the flow length is sometimes insufficient to provide a perfect product. Therefore, it has been required that good engineering plastics be excellent not only in their various physical and mechanical properties but in moldability also. However, it is also known well that the use of a polymer blend to improve the moldability of a heat resistant engineering plastic tends to decrease its heat distortion temperature. Furthermore, while APE has the advantages mentioned above, it can only be used in limited applications since it is not resistant to many organic solvents.

Polyamides are very excellent in their resistance to organic solvents, wear resistance and moldability, but they are not adequately heat resistant as typified by polycaprolactam and polyhexamethylene adipamide which have a heat distortion temperature of 56° C. and 59° C., respectively. As a further disadvantage of polyamides, they have high hygroscopicity and are known to be subject to dimensional variation, changes in mechanical performance and reduction in electrical properties.

A resin composition comprising APE and a polyamide has considerably higher heat distortion temperature than a polyamide as well as higher moldability and solvent resistance than APE and the improvement exceeds what might be expected from the additive effect based on the proportion of the two polymers that constitute the resin composition. Therefore, the resulting composition has very useful properties in that it retains not only the excellent tensile strength, bend recovery characteristics and dimensional stability of APE but the high crack resistance and wear resistance of the polyamide [see Japanese patent application (OPI) Nos. 4146/75 (The term "OPI" as used herein refers to a "published unexamined Japanese patent application".) and 98765/77].

It turned out, however, that articles made, for example, by injection molding of a resin composition comprising APE and polyamide had the following defects: The molded article easily breaks at a thin-walled portion such as a gate or at a long narrow rod-like projection especially when it is absolutely dry. Thus limits are imposed on the practical applications of the polymer such as its release from a mold as well as product design. What is more, even a relatively thick-walled article easily cracks upon impact such as a drop impact and a falling-ball impact especially when it is absolutely dry. All these phenomena constitute a considerable limitation on the usefulness of such resin compositions.

Japanese Patent Publication No. 879/69 describes a method of reacting a mixture of an aromatic dicarboxylic acid and a diphenol with an aromatic dicarboxylic acid chloride to produce an aromatic polyester-polycarboxylic anhydride having ester linkages and a carboxylic acid linkage in the main chain and the use of such an aromatic polyester-polycarboxylic anhydride in the production of a fiber or film.

SUMMARY OF THE INVENTION

It is, therefore, one object of this invention to provide a resin composition having better mechanical performance than the resin composition comprising APE and polyamide.

Another object of this invention is to provide a resin composition that permits the production of a molded article having higher impact properties as well as higher strength at a thin-walled portion than a molded article prepared from the resin composition comprising APE and polyamide.

Other objects of this invention will be apparent as the following description will proceed.

As a result of studies directed to eliminating the defects mentioned above in the conventional resin composition, reliable methods of evaluating the bend strength of a thin-walled portion and impact strength that faithfully reproduce the bending of an actual molded article or impacts applied thereto have been found. Using these techniques it has been found that an aromatic polyester-polycarboxylic anhydride having a structure similar to APE is free from the defects mentioned above in the conventional resin composition.

Therefore, this invention provides a resin composition consisting essentially of:

(A) an aromatic polyester-polycarboxylic anhydride (hereinafter referred to as APEA) prepared from a diphenol and/or a functional derivative thereof and an aromatic dicarboxylic acid and/or a functional derivative thereof (the proportion of the number of acid anhydride linkages being in the range of from about 0.2 to about 50% of the total number of ester and acid anhydride linkages in the polymer);

(B) a polyamide (hereinafter, referred to as "PA") containing therein a repeating unit of the following general formula (IV):

   (IV)

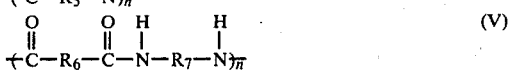   (V)

wherein R₅ is an alkylene group having 4 to 11 carbon atoms; R₆ is an alkylene group having 4 to 11 carbon atoms or

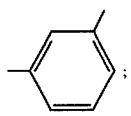

R₇ is an alkylene group having 4 to 11 carbon atoms,

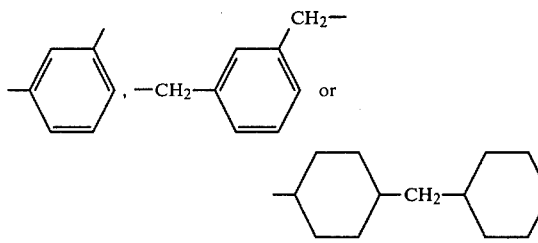

R₇ being an alkylene group when R₆ is

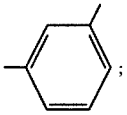

and n is an integer of from 30 to 500.

DETAILED DESCRIPTION OF THE INVENTION

Figure 1:
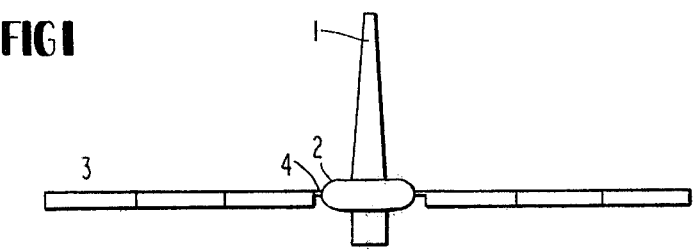
FIG. 1 is a front view of a test piece for testing the bend strength of a gate.

The APEA used as one of the two components of the resin composition according to this invention is an aromatic polyester-polycarboxylic anhydride synthesized from a diphenol and/or a functional derivative thereof and an aromatic dicarboxylic acid and/or a functional derivative thereof.

To be more specific, the diphenol is represented by the following formula (I) or (II):

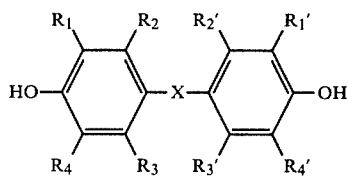

wherein —X— is selected from the group consisting of —O—, —S—, —SO₂—, —SO—, —CO—, an alkylene group containing 1 to 5 carbon atoms, and R₁, R₂, R₃, R₄, R₁', R₂', R₃' and R₄', which may be the same or different, each is selected from the group consisting of a hydrogen atom, a chlorine atom, a bromine atom and an alkyl group containing 1 to 5 carbon atoms.

Suitable examples of alkylene groups for X containing 1 to 5 carbon atoms include a methylene group, an ethylene group, a propylene group, a tetramethylene group and a pentamethylene group. Suitable examples of alkylidene groups for X containing 1 to 5 carbon atoms inclde an ethylidene group, a propylidene group, an isopropylidene group, an isobutylidene group and a pentylidene group. The diphenol may be substituted with particularly 2 or 4 halogen atoms. The preferred locations thereof are at R₁, R₁', when the number of halogen atoms is 2 and at R₁, R₁', R₄ and R₄' when the number of halogen atoms is 4. The unsubstituted diphenol is most preferable.

Suitable examples of alkyl groups for R₁ to R₄ and R₁' to R₄' containing 1 to 5 carbon atoms include straight and branched chain alkyl groups such as a methyl group, an ethyl group, an isopropyl group, a tert-butyl group and a neopentyl group.

$$HO-Ar_1-OH \qquad (II)$$

wherein Ar₁ is

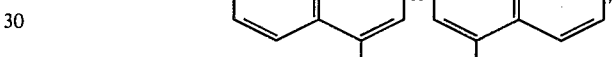

the arylene group Ar₁ may be substituted by an alkyl group having 1 to 5 carbon atoms, or a chlorine or a bromine atom, the number of substituents being from zero to the number of hydrogen atoms by which Ar₁ can be substituted. Suitable examples of the alkyl groups include straight and branched chain alkyl groups such as a methyl group, an ethyl group, an isopropyl group, a tert-butyl group and a neopentyl group.

Examples of the suitable diphenol of the formula (I) which can be used in this invention are 4,4'-dihydroxydiphenyl ether, bis(4-hydroxy-2-methylphenyl)ether, bis(4-hydroxy-3-chlorophenyl)ether, bis(4-hydroxyphenyl)sulfide, bis(4-hydroxyphenyl)sulfone, bis(4-hydroxyphenyl)ketone, bis(4-hydroxyphenyl)methane, bis(4-hydroxy-3-methylphenyl)methane, bis(4-hydroxy-3,5-dichlorophenyl)methane, bis(4-hydroxy-3,5-dibromophenyl)methane, 1,1-bis(4-hydroxyphenyl)ethane, 2,2-bis(4-hydroxy-3-methylphenyl)propane, 2,2-bis(4-hydroxy-3-chlorophenyl)propane, 2,2-bis(4-hydroxy-3,5-dichlorophenyl)propane, 2,2-bis(4-hydroxy-3,5-dibromophenyl)propane, and 1,1-bis(4-hydroxyphenyl)-n-butane. 2,2-bis(4-hydroxyphenyl)propane, bisphenol A is most typical, is easily available, and, accordingly, is most often used.

Examples of the suitable diphenol of the formula (II) are dihydroxynaphthalene such as 4,4'-dihydroxydiphenyl, 2,2'-dihydroxydiphenyl, 2,6-dihydroxynaphthalene, hydroquinone, resorcinol, 2,6-dihydroxytoluene, 2,6-dihydroxychlorobenzene and 3,6-dihydroxytoluene.

Typical examples of the functional derivatives of the diphenol which can be used are the alkali metal salts thereof. Preferred functional derivatives of the diphenol are the sodium salts and the potassium salts. The diphenol or a functional derivative thereof can be used either individually or in a mixture of two or more.

The aromatic dicarboxylic acid used in this invention may be represented by the formula (III):

HOOC—Ar$_2$—COOH     (III)

wherein Ar$_2$ is

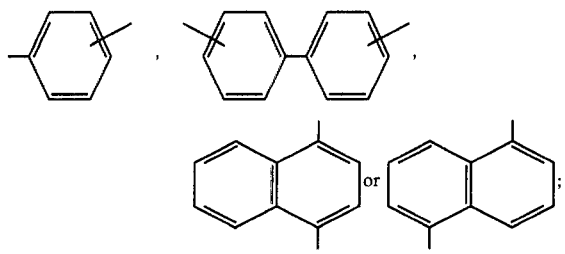

the arylene group Ar$_2$ may be substituted by an alkyl group having 1 to 5 carbon atoms, or a chlorine or a bromine atom; the number of substituents being in the range of from zero to the number of hydrogen atoms by which Ar$_2$ can be substituted. Suitable examples of the alkyl groups include straight and branched chain alkyl groups such as a methyl group, an ethyl group, an isopropyl group, a tert-butyl group and a neopentyl group.

Examples of the suitable aromatic dicarboxylic acid of the formula (III) are terephthalic acid, isophthalic acid, (p,p'-dicarboxy)diphenyl and naphthalene-1,5-dicarboxylic acid.

Derivatives of aromatic dicarboxylic acid are dichlorides and dibromides of the aromatic dicarboxylic acid defined above.

Aromatic dicarboxylic acids or functional derivatives thereof may be used alone or as a mixture of two or more of such compounds. For the purposes of this invention, it is desired to use terephthalic acid or its functional derivative and isophthalic acid or its functional derivative in combination in the molar ratios of from about 1:9 to about 9:1, preferably from 3:7 to 7:3, and more preferably about 5:5.

The APEA to be used in this invention is synthesized by interfacial polymerization, solution polymerization or other suitable methods. To synthesize APEA by interfacial polymerization an aromatic dicarboxylic acid halide dissolved in an organic solvent immiscible with water is mixed with an aqueous alkaline solution of diphenol. The diphenol is first reacted with an excess aromatic dicarboxylic acid halide for a certain period of time, followed by addition of the remaining diphenol so as to prepare APEA. In this two-stage reaction for production of APEA, the molar ratio of aromatic dicarboxylic acid halide to diphenol for the first stage reaction ranges from about 1:0.1 to 1:0.98, preferably from 1:0.2 to 1:0.9, whereas the molar ratio for the second stage reaction ranges from about 1:1 to 1:1.5, preferably from 1:1 to 1:1.1. The reaction period for the first stage reaction generally ranges from about 5 seconds to about 10 hours, preferably from 1 minute to 2 hours, and that for the second stage reaction ranges from about 1 hour to about 20 hours, preferably from 2 hours to 10 hours. A suitable temperature for both stages of the interfacial polymerization is about 5° to 40° C. and preferably about 10° to 30° C. It is essential that an alkali metal be present in the reaction system in a molar amount at least equal to diphenol. Examples of the preferred alkali metal are lithium, sodium and potassium. Interfacial polymerization can be performed by a conventional method details of which are described in, for example, U.S. Pat. Nos. 3,884,990 and 3,946,091.

The APEA can also be prepared by solution polymerization wherein aromatic dicarboxylic acid, aromatic dicarboxylic acid halide and diphenol are reacted together in an organic solvent. The concentration is usually about 0.01 mol/l to 0.2 mol/l and preferably about 0.03 mol/l to 0.1 mol/l. The molar ratio of aromatic dicarboxylic acid and aromatic dicarboxylic acid halide ranges from about 0.99:0.01 to about 0.8:0.2, preferably from 0.98:0.02 to 0.95:0.05. About 1 mol of diphenol is reacted with from 1 to 1.5 mols of the total of aromatic dicarboxylic acid and aromatic dicarboxylic acid halide in the presence of a tertiary amine such as pyridine, triethylamine or trimethylamine. A suitable temperature for the reaction ranges from about 5° C. to the boiling point of the organic solvent solution used. Solution polymerization can be performed by a conventional method described in, for example, U.S. Pat. Nos. 3,884,900 and 3,946,091.

The APEA used in this invention can also be prepared in accordance with the method described in Japanese Pat. Publication No. 879/69. According to this conventional method, an aqueous alkaline solution of aromatic dicarboxylic acid and diphenol is mixed with aromatic dicarboxylic acid halide dissolved in an organic solvent immiscible with water such as chloroform, methylene chloride or tetrachloroethane, and the mixture is subjected to interfacial polymerization. Aromatic dicarboxylic acid, aromatic dicarboxylic acid halide and diphenol are used in the same proportions as specified for solution polymerization described above. Interfacial polymerization of the mixture can be performed by a conventional method as described in, for example, U.S. Pat. Nos. 3,884,900 and 3,946,091.

The APEA to be used in this invention contains from about 0.2 to about 50%, preferably from about 0.5 to 20%, and most preferably from about 1 to 10% anhydride linkages based on the total number of ester and anhydride linkages in the polymer. The APEA containing about 0.2 to about 50%, preferably from about 0.5 to 20%, and most preferably from about 1 to 10% anhydride linkages provides a resin composition of good mechanical properties. If the APEA contains less than about 0.2% anhydride linkages, the intended effect of the anhydride linkage will not be achieved and if the APEA contains more than about 50% anhydride linkages, a resin composition of good mechanical properties is difficult to obtain perhaps because of the difficulty in preparing a polymer of satisfactorily high molecular weight.

In order to insure good physical properties the APEA used in this invention should have a logarithmic viscosity number ($\eta_{inh}$), defined by the following equation, of about 0.3 to about 1.5, preferably 0.4 to 0.8.

$$\eta_{inh} = \frac{\log_e t_1/t_2}{C}$$

wherein $t_1$ is the falling time (in seconds) of a solution of the APEA; $t_2$ is the falling time (in seconds) of the solvent; and C is the concentration (g/dl) of the APEA in the solution. The logarithmic viscosity number used herein is determined in a 1,1,2,2-tetrachloroethane-phenol mixture (weight ratio: 4:6) at 25° C.

The PA component of the resin composition of this invention is a compound having therein a repeating unit represented by the following general formula (IV):

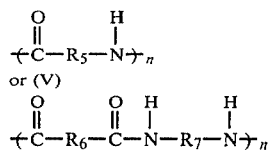

wherein $R_5$ is an alkylene group having 4 to 11 carbon atoms; $R_6$ is an alkylene group having 4 to 11 carbon atoms or

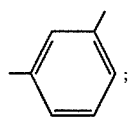

$R_7$ is an alkylene group having 4 to 11 carbon atoms,

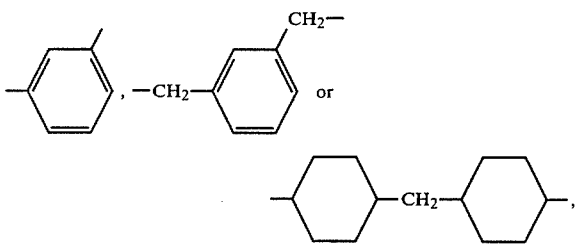

$R_7$ being an alkylene group when $R_6$ is

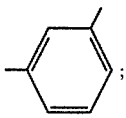

and n is an integer of 30 to 500. Some of the alkylene groups (e.g., $R_5$, $R_6$ and $R_7$) may be replaced by aromatic groups, e.g.,

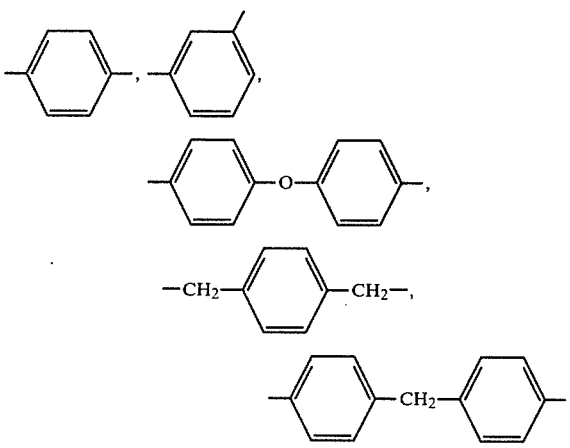

etc., or alicyclic groups, e.g.,

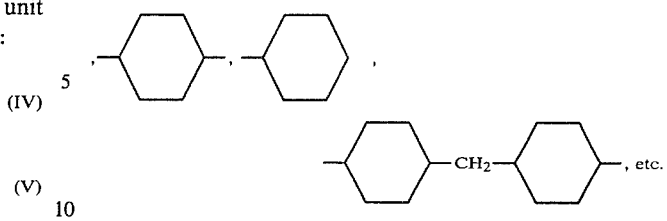

Suitable examples of alkylene groups containing 4 to 11 carbon atoms for $R_5$ to $R_7$ include a tetramethylene group, a pentamethylene group, a hexamethylene group, a heptamethylene group, an octamethylene group, a nonamethylene group, a decamethylene group, and an undecamethylene group.

Any PA which contains a repeating unit represented by either of the above general formulae (IV) and (V) can be used in this invention. Generally these polyamides should melt at about 180° to 340° C. and preferably about 200° to 300° C. Preferred examples of the PA include polyhexamethylene adipamide, polycaprolactam, polyhexamethylene sebacamide, polydecamethylene adipamide, polyaminoundecanoic acid, and polylaurolactam.

Copolyamides can also be used as the PA in this invention. Examples of suitable copolyamides include a copolyamide derived from caprolactam and hexamethylene adipamide, and a copolyamide derived from caprolactam and hexamethylene sebacamide.

The proportion of (A) APEA to (B) PA as constituents of the resin composition of this invention is in the range (by weight) from about 1:9 to about 9:1, preferably from 3:7 to 7:3. If the proportion is in the above range, the resin composition obtained exhibits equally high levels of heat distortion temperature, moldability and solvent resistance.

Any suitable method can be employed to mix the component (A) with component (B) to produce the resin composition of this invention so long as the two components make a substantially uniform dispersion. If the percent by weight of the component (A) is less than that of the component (B), part of the component (B) is first mixed with component (A) before the remainder of (B) is added to the mixture. Incomplete or uneven dispersion provides relatively large aggregates of the components (A) and (B), which should be avoided because they impair the mechanical properties of the resulting resin composition.

The resin composition according to this invention is by far less brittle than the equivalent resin composition comprising APE and PA. Especially, improved practical performance with respect to impact properties and strength at a thin-walled portion greatly expands the scope of application of the resin composition of this invention. Particularly a molded article prepared from the resin composition of this invention exhibits good mechanical properties when mixed in a molten state at a temperature in the range of from about 180° to about 340° C., preferably from 200° to 300° C., for a period in the range of from about 30 seconds to about 30 minutes, preferably from 1 minute to about 10 minutes to prepare the pellet and then molding or shaping using the obtained pellet. The temperature in molding and shaping is about 230° C. to about 300° C. and preferably about 250° to 280° C.

To make a closer study of the reason for great improvements realized in the mechanical properties of the resin composition of this invention, the present inventors have prepared molded articles each from a molten blend of the resin composition of this invention comprising APEA and PA and that of the equivalent resin composition comprising APE and PA, extracted one component from the cross section of each molded article, and observed the surface of the cross section under a scanning electron microscope. The microscopic observation shows that while the two resin compositions had been subjected to the same conditions for blending in a molten state, the resin composition according to this invention comprises a uniform fine dispersion of the two components whereas the conventional resin composition comprises an uneven dispersion of the components in relatively large particles.

If the resin composition of the present invention contains more than about 50% by weight of PA, islands of APEA are dispersed in the sea of PA in a roughly spherical form having an average diameter in the range of from about 0.2 to about 2 microns. With such a high content of PA, the resin composition of this invention comprising APEA and PA is shown to include a number of APEA spherical particles the size of less than about 0.2 micron, but the resin composition comprising APE and PA has not only few of such fine particles but the included APE particles are irregularly shaped and relatively large in average diameter. Such contrasting characterization of the two resin compositions holds good even if the conditions for blending in a molten state are varied. Therefore, it is obvious that the APEA has higher affinity for PA than APE, thus providing a resin composition with better mechanical properties.

Another possible reason for the great improvement in the mechanical properties of the resin composition of this invention resulting from blending in a molten state under the above specified conditions is the molecular chain of the block polymer or graft polymer formed between APEA and PA as a result of chemical reactions that have occurred between the acid anhydride linkage of APEA and the amino terminal as well as amide linkage of PA subsequent to the thermal history experienced by the resin composition in the course of blending in a molten state. Therefore, it is contemplated that the products produced by these chemical reactions are included in the resin composition of this invention.

If desired, to improve the thermal stability of the resin composition of this invention, various thermal stabilizers such as amine compounds, phosphorus compounds, and hindered phenols can be added thereto. Usually the thermal stabilizers are used in an amount of about 0.01 to about 5% by weight based on the weight of the resin composition.

Various weather resisting agents can be added to the resin composition of this invention to improve the weatherability thereof. Examples of suitable weather resisting agents include benzotriazole derivatives and benzophenone derivatives. Particularly preferred examples of these compounds are 2-(2'-hydroxy-5'-methylphenol)benzotriazole, 2-(2'-hydroxy-3'5'-di-t-butylphenyl)-5-chlorobenzotriazole, 2-(2'-hydroxy-3'-t-butyl-5'-methylphenyl)-5-chlorobenzotriazole, etc. Usually, the weather resisting agent is used in an amount of about 0.01 to about 5% by weight based on the weight of the resin composition.

A phosphorus compound such as an orthophosphoric ester, an acid orthophosphoric ester, orthophosphoric acid, a phosphorous ester, an acid phosphorous ester or phosphorous acid, when added in an amount of 0.01 to 0.5% by weight based on the total weight of the resin composition, produces good results as a coloration inhibitor.

If desired, ordinary reinforcing fillers, such as glass fibers, inorganic silicates, silica, quartz, silica gel, carbon fibers, cristobalite, asbestos, clay or talc, may also be incorporated in the resin composition of this invention. A suitable amount of these reinforcing fillers ranges from about 1 to about 50% by weight based on the weight of the resin composition.

Furthermore, in order to further improve the mechanical properties, such as impact strength or elongation at break, of the resin composition of this invention, it is possible to add a rubber such as acrylonitrile-butadiene rubber or styrene-butadiene rubber, an acrylonitrile/butadiene/styrene (ABS) resin, a polycarbonate, polyethylene, polypropylene, a polyurethane, polystyrene, EVA copolymers, poly(acrylates), polytetrafluoroethylene, or poly(methyl methacrylate) to the resin composition. A suitable amount of these rubbers or polymer materials which can be used is about 1 to about 30% by weight, preferably about 1 to about 10% by weight, based on the weight of the resin composition.

If desired, fire retardants or fire retardant aids may be used. Suitable fire retardants are aromatic halides, and especially decabromodiphenyl ether is preferred. A preferred fire retardant aid is $Sb_2O_3$. The amount of each agent to be added ranges from about 0.5 to about 40 wt%, preferably from 0.1 to 20 wt% based on the total weight of the resin composition.

The resin composition of this invention exhibits high heat resistance, mechanical properties and moldability. An article molded from the composition is resistant to cracking upon impact and the article is also resistant to breaking at a thin-walled portion.

The resin composition of this invention can be used in the form of powders, chips, etc., which can be molded into various useful molded articles by compression molding, injection molding, extrusion molding and the like using conventional molding processes. Examples of molded articles which can be produced include gears, bearings, electrical component parts, containers and various other articles which are used widely in those fields where engineering plastics of high quality are required.

The following examples are given to illustrate this invention in greater detail. These examples should be considered, however, as merely exemplary and non-limiting. Unless otherwise indicated herein, all parts, percents, ratios and the like are by weight.

Following are methods of evaluating the bend strength of a thin-walled portion and the impact strength of a molded article.

(1) Method of Evaluating the Bend Strength of a Thin-Walled Portion

Figure 2:
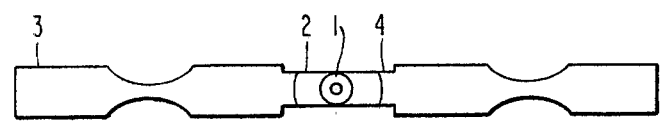
FIG. 2 is a planar view of the test piece.

With reference to FIGS. 1 and 2 of the accompanying drawings, 1 is a sprue of an injection molded article, 2 is a runner, 3 is a test piece and 4 is a gate. The runner has a diameter of 8 mm, the gate is 8 mm wide and 1 mm thick, the gate land (that portion of the gate in longitudinal direction) has a minimum length of 2 mm, and the test piece is a tensile impact piece of size S ⅛ inch thick as defined in ASTM D-1822. The test piece 3 as molded under given conditions is immediately subjected to bend testing which comprises one upward bending and one downward bending of the test piece until it is normal to the runner 2 at the gate 4; complete breaking of the gate so that the test piece is disconnected from the runner is rated x, partial breaking which does not cause complete disconnection is rated Δ and no breaking is rated o, with the percentage of the rating o being defined as the gate non-break factor.

(2) Method of Evaluating the Impact Strength of a Molded Article

Figure 3:
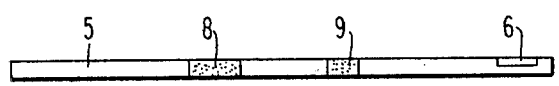
FIG. 3 is a front view of a specimen from which a test piece for Dynstat impact testing is cut.
Figure 4:
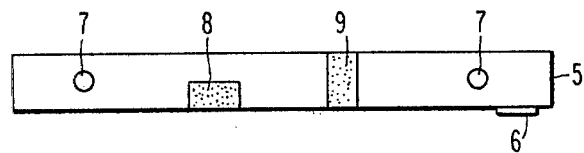
FIG. 4 is a planar view of the specimen.

As a result of studies on an evaluation method which most faithfully reproduces the cracking that may develop on a practical injection molded article upon impact, the present inventors have confirmed that Dynstat impact test (British Standard or BS 1330) that corresponds to an unnotched Izod impact test is more reliable than V-notched Izod impact test which is commonly employed for determining impact strength. Therefore, marks 7 were cut from between two ejector pins of a $\frac{1}{2}'' \times 5'' \times \frac{1}{8}''$ rod-like test piece 5 shown in FIGS. 3 and 4 of the accompanying drawing a $\frac{1}{2}'' \times \frac{1}{4}'' \times \frac{1}{8}''$ test piece (slightly modified from the dimensions defined in BS 1330) in a direction either parallel or vertical to the resin flow and measured the impact strength of the test piece with a Dynstat impact testing machine. In FIGS. 3 and 4, the numeral 6 represents a gate. The impact strengths as determined by using test pieces 8 and 9 are hereunder expressed as Iy and Ix, respectively; Iy represents an impact strength in a direction vertical to the resin flow, and Ix is an impact strength in a direction parallel to the resin flow. Impact strength was determined after drying at 100° C. for 16 hours. The calculation formula for impact strength was as follows:

$$\text{Impact Strength (kg} \cdot \text{cm/cm}^2) \frac{\text{Breaking Energy (kg} \cdot \text{cm)}}{\text{Cross-Sectional Area of Specimen (cm}^2)}$$

Evaluation according to the above methods of an article molded from a resin composition consisting of APE or PA only gave a gate strength rating of o and a Dynstat impact strength more than 100 kg·cm/cm² both for Ix and Iy. On the other hand, an article molded from a blend of APE and PA gave the rating x as gate strength and a Dynstat impact strength of about 10 kg·cm/cm² for both Ix and Iy. It was, therefore, clear that it was brittle at a thin-walled portion and low in impact strength. However, measurement with an article molded from a resin composition comprising APEA (containing 3% of the unit of acid anhydride linkage) and PA gave the rating o as gate strength and a Dynstat impact strength of at least about 100 kg·cm/cm² for both Ix and Iy. The article was entirely free from brittleness.

(3) Evaluation for the Proportion of the Unit of Acid Anhydride Linkage

A model polymer having essentially acid anhydride linkages was prepared by reacting an equimolar mixture of terephthaloyl chloride and isophthaloyl chloride with sodium benzoate. A model polymer having essentially ester linkages was prepared by reacting bisphenol A with benzoyl chloride. The infrared absorption peaks for the two model polymers (1800 cm$^{-1}$ for the acid anhydride linkage and 1740 cm$^{-1}$ for the ester linkage) were compared with those obtained for APEA to determine the proportions of the two linkage units.

Infrared spectrophotometry is not an accurate method for determining the proportion of the acid anhydride linkage contained in an amount of less than 5%. Instead, drawing upon the fact that the acid anhydride linkage is hydrolyzed at a rate different than the ester linkage, the APEA is chemically treated under such conditions as permit substantially selective breaking of the acid anhydride linkage, and the number average molecular weights of the APEA before and after the breaking are measured, and the following calculation is used to determine the proportion of the acid anhydride linkage:

$$\left( \frac{1}{M_A} - \frac{1}{M_B} \right) \times M \times 100$$

wherein $M_A$: the number average molecular weight after selective breaking of the acid anhydride linkage $M_B$: the number average molecular weight before the breaking M: the molecular weight per repeating unit of the polymer $M_B$ is measured by the vapor pressure method in benzene at 40° C. at a concentration (c) of 0.5 g/dl to 2 g/dl.

$M_A$ is measured by the vapor pressure method in the same condition as in the $M_B$ in the procedure comprising dissolving 1 g of the polymer in the mixed solution of 5 ml of phenol, 0.1 g of caustic soda and 100 ml of methylene chloride, stirring the solution at 30° C. for a period of 2 hours, and then washing successively the methylene chloride phase with an aqueous alkali solution one time and deionized water 5 times, followed by removal of the methylene chloride.

EXAMPLES 1 to 3 and COMPARATIVE EXAMPLES 1 to 3

A 200-liter jacketed reactor was charged with an aqueous alkaline solution of bisphenol A comprising 4.65 kg (20.37 mols) of bisphenol A, 1.79 kg of caustic soda, 77 g (0.45 mol) of orthophenylphenol, 29 g of trimethyl benzyl ammonium chloride and 120 kg of water, and had its temperature controlled at 20° C. A solution of a mixture of 2.43 kg (11.97 mols) of terephthaloyl dichloride and 2.43 kg (11.97 mols) of isophthaloyl dichloride in 76.3 kg of methylene chloride and controlled at 15° C. was rapidly added to the aqueous alkaline solution of bisphenol A under vigorous stirring by a homogenizer which continued for a period of 120 minutes. Thereafter, an aqueous alkaline solution of bisphenol A maintained at 20° C. and comprising 0.82 kg (3.5 mols) of bisphenol A, 0.32 kg of caustic soda and 18 kg of water was added to the polymerization liquor, which was stirred for an additional period of 240 minutes. After the reaction, the polymerization liquor was left to stand still for isolating the solution of the resulting polymer in methylene chloride, which was washed first with aqueous acetic acid, then with deionized water, followed by addition of acetone to isolate the polymer which was washed with water and dried. Infrared spectrophotometry of the powder of the resulting polymer indicated the presence of 9.5% of acid anhydride linkage. The polymer had a logarithmic viscosity number of 0.87 for 1 g/100 cc as measured in tetrachloroethane at 25° C. For the sake of simplicity, the polymer powder will hereunder be referred to as U-1.

A control polymer powder was prepared by repeating the procedure described above except that 5.47 kg (23.87 mols) of bisphenol A was added to the reaction system without being divided into two portions and the stirring for polymerization continued for a period of 4 hours. Infrared spectrophotometry and hydrolysis showed that the resulting polymer contained less than 0.1% of the acid anhydride linkage, suggesting that the polymer was APE substantially free from an acid anhydride linkage. The logarithmic viscosity number of the polymer was 0.65. The polymer powder will hereunder be referred to as U-2.

Either U-1 or U-2 was blended with nylon 6 [A 1030, a product of Unitika, having a logarithmic viscosity number of 1.020 as measured in 6:4 phenol/tetrachloroethane (by weight)] by a super mixer in the proportions indicated in Table 1 below, vacuum dried at 100° C. for a period of 8 hours, and extruded from an extruder at 265° C. Thereafter, an injection molding machine was used to mold the extruded blend into articles of the shapes described in accompanying FIGS. 1 to 4 at a cylinder temperature of 260° C. and a mold temperature of 80° C.

Table 1 below shows the results of evaluation of the tensile impact strength and Dynstat impact strength of the molded articles obtained.

Obviously, the resin composition using APEA according to this invention has a significantly better tensile impact strength and Dynstat impact strength in comparison with the resin composition using APE.

EXAMPLES 4 TO 13

Powders U-3 to U-12 set forth in Table 2 below were prepared by repeating the procedure of Examples 1 to 3 except that the time from the first addition of bisphenol A to the second addition of the same were varied as indicated in Table 2 below. In accordance with the procedures used in Examples 1 to 3, each resulting powder was blended with nylon 6 (the same as used in Examples 1 to 3) in the proportions indicated in Table 2, dried, extruded, and injection molded to produce shaped articles which were subjected to evaluation of their mechanical properties. The results of the evaluation are shown in Table 3 below.

Obviously, the resin composition prepared according to this invention had significantly higher gate non-break factor and Dynstat impact strength than the control.

TABLE 2

| APEA | Time between Additions of Bisphenol A (min) | Logarithmic Viscosity Number in Tetrachloroethane | Proportion of Acid Anhydride Linkage Unit (%) |
| --- | --- | --- | --- |
| U-3 | 0.2 | 0.68 | 0.25 |
| U-4 | 1.0 | 0.70 | 0.5 |
| U-5 | 10 | 0.74 | 0.7 |
| U-6 | 15 | 0.80 | 1.0 |
| U-7 | 30 | 0.88 | 2.1 |
| U-8 | 60 | 0.81 | 5.8 |
| U-9 | 130 | 0.74 | 10.0 |
| U-10 | 180 | 0.55 | 20.0 |
| U-11 | 240 | 0.48 | 24.7 |
| U-12 | 480 | 0.45 | 49.0 |

TABLE 1

| Run. No. | APEA Parts by Weight (U-1) | APE Parts by Weight (U-2) | Nylon 6 Parts by Weight | Tensile Impact (kg·cm/cm$^2$) | Dynstat Ix (kg·cm/cm$^2$) | Dynstat Iy (kg·cm/cm$^2$) |
| --- | --- | --- | --- | --- | --- | --- |
| Example 1 | 70 | — | 30 | 206 | 120 | 131 |
| Example 2 | 50 | — | 50 | 255 | 143 | 151 |
| Example 3 | 30 | — | 70 | 260 | 145 | 158 |
| Comparative Example 1 | — | 70 | 30 | 35 | 14 | 15 |
| Comparative Example 2 | — | 50 | 50 | 53 | 11 | 17 |
| Comparative Example 3 | — | 30 | 70 | 65 | 16 | 20 |

The molded articles prepared in Example 2 and Comparative Example 2 were ruptured in liquid nitrogen, treated with methylene chloride to extract APEA or APE from the rupture cross-section which was observed under a scanning electron microscope (×3,000). The molded article of Example 2 had a uniform dispersion of APEA having an average particle size of 1.9 microns, with a number of particles being of the size less than 0.2 micron. On the other hand, the molded article of Comparative Example 2 comprised particles of an average size of 10 microns, with only a limited number of particles being less than 0.2 micron in size.

TABLE 3

| Run No. | APEA | A EA Parts by Weight | APE Parts by Weight | Nylon 6 Parts by Weight | Gate Non-Break Factor (%) | Dynstat Iy (kg·cm/cm$^2$) |
| --- | --- | --- | --- | --- | --- | --- |
| Example 4 | U-3 | 50 | — | 50 | 65 | 68 |
| Example 5 | U-4 | 50 | — | 50 | 93 | 77 |
| Example 6 | U-5 | 50 | — | 50 | 100 | 84 |
| Example | | | | | | |

TABLE 3-continued

| Run No. | APEA | A EA Parts by Weight | APE Parts by Weight | Nylon 6 Parts by Weight | Gate Non-Break Factor | Dynstat Iy |
|---|---|---|---|---|---|---|
| Example 7 | U-6 | 50 | — | 50 | 100 | 107 |
| Example 8 | U-7 | 50 | — | 50 | 100 | 112 |
| Example 9 | U-8 | 50 | — | 50 | 100 | 127 |
| Example 10 | U-9 | 50 | — | 50 | 100 | 175 |
| Example 11 | U-10 | 50 | — | 50 | 100 | 63 |
| Example 12 | U-11 | 50 | — | 50 | 100 | 35 |
| Example 13 | U-12 | 50 | — | 50 | 74 | 28 |
| Comparative Example 2 | — | — | 50 | 50 | 0 | 17 |

EXAMPLES 14 to 24 and Comparative Example 4

In accordance with the procedures used in Examples 1 to 3, 50 parts by weight of U-1 through U-13 prepared in Examples 1 through 13 were blended with 50 parts by weight of nylon 66 as polyamide [having a logarithmic viscosity number of 1.2 as measured in 6:4 phenol/tetrachloroethane (by weight)], dried, and extruded from an extruder at 280° C. Thereafter, an injection molding machine was used to mold the extruded blend into articles of the shapes described in FIGS. 1 to 4 at a cylinder temperature of 280° C. and a mold temperature of 80° C. Table 4 below shows the results of evaluation of the mechanical properties of the shaped articles obtained.

As a control No. 4, the procedure used in Examples 14 to 24 was repeated to blend 50 parts by weight of APE U-2 prepared in Comparative Examples 1 to 3 with an equal amount of nylon 66 described above, and the blend was dried, extruded and injection molded to produce a shaped article which was subjected to measurement of its mechanical properties. The result of measurement is also shown in Table 4 below.

TABLE 4

| Run No. | APEA | APEA (parts by wt) | APE | APE (parts by wt) | Nylon 66 (parts by wt) | Gate Non-Break Factor (%) | Dynstat Iy (kg·cm/cm²) |
|---|---|---|---|---|---|---|---|
| Ex.14 | U-1 | 50 | — | — | 50 | 80 | 70 |
| Ex.15 | U-3 | 50 | — | — | 50 | 89 | 76 |
| Ex.16 | U-4 | 50 | — | — | 50 | 100 | 92 |
| Ex.17 | U-5 | 50 | — | — | 50 | 100 | 103 |
| Ex.18 | U-6 | 50 | — | — | 50 | 100 | 119 |
| Ex.19 | U-7 | 50 | — | — | 50 | 100 | 130 |
| Ex.20 | U-8 | 50 | — | — | 50 | 100 | 156 |
| Ex.21 | U-9 | 50 | — | — | 50 | 100 | 145 |
| Ex.22 | U-10 | 50 | — | — | 50 | 100 | 91 |
| Ex.23 | U-11 | 50 | — | — | 50 | 95 | 46 |
| Ex.24 | U-12 | 50 | — | — | 50 | 70 | 40 |
| Com. Ex. 4 | — | — | U-2 | 50 | 50 | 0 | 21 |

EXAMPLES 25 to 33 and Comparative Examples 5 to 7

A 200-liter jacketed reactor was charged with an aqueous alkaline solution of bisphenol A comprising 4.65 kg (20.37 mols) of bisphenol A, 1.79 kg of caustic soda, 77 g (0.45 mol) of orthophenylphenol, 30 g of tetraethyl ammonium chloride and 120 kg of water, and had its temperature controlled at 20° C. A solution of mixture of 2.43 kg (11.97 mols) of terephthaloyl dichloride and 3.03 kg (11.97 mols) of 1,5-naphthalene dicarboxylic acid dichloride in 100 kg of methylene chloride and controlled at 15° C. was rapidly added to the aqueous alkaline solution of bisphenol A under vigorous agitation that continued for a period of 30 minutes. Thereafter, an aqueous alkaline solution of bisphenol A maintained at 20° C. and comprising 0.82 kg (3.5 mols) of bisphenol A, 0.32 kg of caustic soda and 18 kg of water was added to the polymerization liquor which was stirred for an additional period of 10 hours. After the reaction, the polymerization liquor was left to stand still for isolating the solution of the resulting polymer in methylene chloride, followed by 5 cycles of washing with deionized water under stirring and leaving the solution to stand still. Then, one part by weight of acetone was added to one part by weight of the solution in methylene chloride so as to isolate the polymer. The resulting APEA was found to contain 2.0% of the acid anhydride linkage and a logarithmic viscosity number of 0.75 for 1 g/100 cc as measured in tetrachloroethane at 25° C. The APEA will hereunder be referred to as U-13.

U-13 was blended with either one of nylon 6 used in Examples 1 to 3, nylon 66 used in Examples 14 to 22 and nylon 6,10 [having a logarithmic viscosity number of 1.1 as measured in 6:4 phenol/tetrachloroethane (by weight)] in the proportions indicated in Table 5 below, vacuum dried at 100° C. for 8 hours, and extruded from an extruder at 270° C. to 280° C. Thereafter, an injection molding machine was used to mold the extruded blend into articles of the shapes described in FIGS. 1 to 4 at a cylinder temperature of 260° to 270° C. and a mold temperature of 80° C.

Table 5 shows the results of measurement of the gate non-break factor and Dynstat impact strength of the shaped articles obtained.

Three control polymers were prepared by repeating the procedure described above except that 5.47 kg (23.87 mols) of bisphenol A was added to the reaction system without being divided into two portions and the stirring for polymerization continued for a period of 5 hours. Each of the resulting polymers was found to contain less than 0.1% of the unit of acid anhydride linkage, suggesting that they were APE substantially free from an acid anhydride linkage. These APEs had a logarithmic viscosity number of 0.65 for 1 g/100 cc as measured in tetrachloroethane at 25° C. The APE will hereunder referred to as U-14.

U-14 was blended with nylon 6, nylon 66 or nylon 6,10 (the same as used in Examples 25 to 33) in the proportions indicated in Table 6 below, dried, extruded and injection molded according to procedure used in Examples 25 to 33. The results of measurement of the mechanical properties of the molded articles are also shown in Table 6 below.

TABLE 5

| Run No. | APEA (U-13) (parts by wt) | Nylon 6 (parts by wt) | Nylon 66 (parts by wt) | Nylon 6, 10 (parts by wt) | Gate Non-Break Factor (%) | Dynstat Iy (kg·cm/cm²) |
|---|---|---|---|---|---|---|
| Ex.25 | 30 | 70 | — | — | 100 | 180 |
| Ex.26 | 50 | 50 | — | — | 100 | 150 |

TABLE 5-continued

| Run No. | APEA (U-13) (parts by wt) | Nylon 6 (parts by wt) | Nylon 66 (parts by wt) | Nylon 6, 10 (parts by wt) | Gate Non-Break Factor | Dynstat Iy |
|---|---|---|---|---|---|---|
| Ex.27 | 70 | 30 | — | — | 100 | 130 |
| Ex.28 | 30 | — | 70 | — | 100 | 175 |
| Ex.29 | 50 | — | 50 | — | 100 | 160 |
| Ex.30 | 70 | — | 30 | — | 100 | 140 |
| Ex.31 | 30 | — | — | 70 | 100 | 150 |
| Ex.32 | 50 | — | — | 50 | 100 | 140 |
| Ex.33 | 70 | — | — | 30 | 100 | 120 |

TABLE 6

| No. | APE (U-14) (parts by wt) | Nylon 6 (parts by wt) | Nylon 66 (parts by wt) | Nylon 6, 10 (parts by wt) | Gate Non-Break Factor (%) | Dynstat Iy (kg · cm/cm²) |
|---|---|---|---|---|---|---|
| Comp. Ex.5 | 50 | 50 | — | — | 0 | 15 |
| Comp. Ex.6 | 50 | — | 50 | — | 0 | 13 |
| Comp. Ex.7 | 50 | — | — | 50 | 0 | 17 |

EXAMPLE 34 and Comparative Example 8

A mixture of 1.87 kg (9.2 mols) of terephthaloyl dichloride and 2.80 kg (13.8 mols) of isophthaloyl dichloride was dissolved in 100 kg of methylene chloride and the solution controlled at 20° C. A 200-liter jacketed reactor was charged with an aqueous alkaline solution of diphenol comprising 3,648 g (16 mols) of bisphenol A, 640 g (4.0 mols) of 1,5-dihydroxynaphthalene, 68 g (0.4 mol) of orthophenylphenol, 1.81 kg of caustic soda, 30 g of tetraethyl ammonium chloride and 120 kg of water, and had its temperature controlled at 20° C. The separately prepared solution of terephthaloyl dichloride was added within 30 seconds to the alkaline aqueous solution of diphenol under vigorous stirring that continued for a period of 30 minutes. Thereafter, an aqueous alkaline solution of diphenol maintained at 20° C. and comprising 365 g of bisphenol A, 64 g of 1,5-dihydroxynaphthalene, 194 g of caustic soda and 15 kg of water was added to the polymerization liquor which was stirred for an additional period of 10 hours. After the reaction, the polymerization liquor was left to stand still to isolate the solution in methylene chloride which was washed with an equal volume of ion exchanged water, stirred and left to stand still, with the cycle of such washing repeated 5 times. The solution in methylene chloride was further treated with an equal volume of acetone to isolate the resulting APEA polymer. The polymer was found to contain 3.0% of the acid anhydride linkage and have a logarithmic viscosity number of 0.80 for 1 g/100 ml was measured in tetrachloroethane at 25° C. The resulting APEA will hereunder be referred to as U-15.

A control polymer was prepared by repeating the procedure described above except that 4013 g of bisphenol A and 704 g of 1,5-dihydroxynaphthalene were added to the reaction system without using additional bisphenol A and that the stirring for polymerization continued for a period of 5 hours. The control polymer was found to contain less than 0.1% of the unit of acid anhydride linkage, suggesting that it was an APE substantially free from an acid anhydride linkage. The resulting APE was found to have a logarithmic viscosity number of 0.71 for 1 g/100 ml as measured in tetrachloroethane at 25° C. The APE will hereunder be referred to as U-16.

U-15 or U-16 was blended in a V-blender with nylon 6 (the same as used in Examples 1 to 3) in the proportions indicated in Table 7 below, vacuum dried at 100° C. for a period of 8 hours, and extruded from an extruder at 270° C. Thereafter, an injection molding machine was used to mold the extruded blend into articles of the shapes described in FIGS. 1 to 4 at a cylinder temperature and mold temperature of 270° C. and 80° C., respectively. The results of measurement of the gate non-break factor and Dynstat impact strength of the molded articles are shown in Table 7 below.

TABLE 7

| Run No. | APEA (U-15) (parts by wt) | APE (U-16) (parts by wt) | Nylon 6 (parts by wt) | Gate Non-Break Factor (%) | Dynstat Iy (kg · cm/cm²) |
|---|---|---|---|---|---|
| Ex.34 | 50 | — | 50 | 100 | 152 |
| Comp. Ex. 8 | — | 50 | 50 | 0 | 17 |

While the invention has been described in detail and with reference to specific embodiments thereof, it will be apparent to one skilled in the art that various changes and modifications can be made therein without departing from the spirit and scope thereof.

What is claimed is:

1. A resin composition consisting essentially of:
(A) an aromatic polyester-polycarboxylic anhydride prepared from a diphenol, a functional derivative thereof, or a mixture thereof, and an aromatic dicarboxylic acid, a functional derivative thereof, or a mixture thereof, the proportion of the acid anhydride linkage which forms an integral part of the polymeric chain being about 0.2 to about 50% based on the total number of ester linkages and f acid anhydride linkages and
(B) a polyamide containing therein a repeating unit of the following formula (IV):

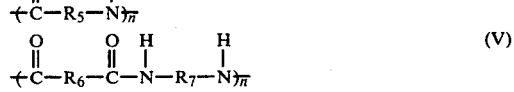

wherein $R_5$ is an alkylene group having 4 to 11 carbon atoms; $R_6$ is an alkylene group having 4 to 11 carbon atoms or

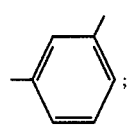

$R_7$ is an alkylene group having 4 to 11 carbon atoms,

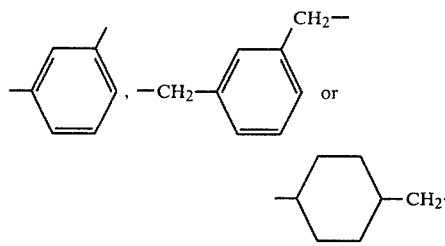

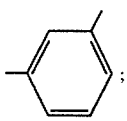

$R_7$ being an alkylene group when $R_6$ is

and n is an integer of from 30 to 500.

2. The resin composition according to claim 1, wherein the diphenol is represented by the formula (I):

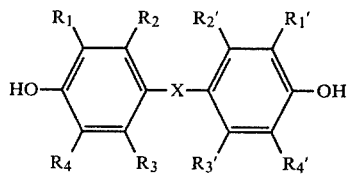

wherein —X— is selected from the group consisting of —O—, —S—, —SO$_2$—, —SO—, —CO—, and an alkylene group containing 1 to 5 carbon atoms, and $R_1$, $R_2$, $R_3$, $R_4$, $R_1'$, $R_2'$, $R_3'$ and $R_4'$, which may be the same or different, each is selected from the group consisting of a hydrogen atom, a chlorine atom, a bromine atom and an alkyl group containing 1 to 5 carbon atoms, or the formula (II):

HO—Ar$_1$—OH          (II)

wherein Ar$_1$ is

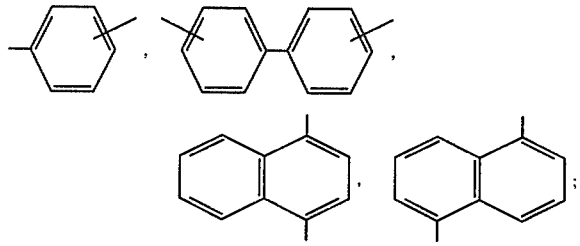

an arylene group Ar$_1$ may be substituted by an alkyl group having 1 to 5 carbon atoms, or a chlorine or a bromine atom; the number of substituents being in the range of from zero to the number of hydrogen atoms by which Ar$_1$ can be substituted.

3. The resin composition according to claim 1, wherein the aromatic dicarboxylic acid is represented by the formula (III):

HOOC—Ar$_2$—COOH          (III)

wherein Ar$_2$ is

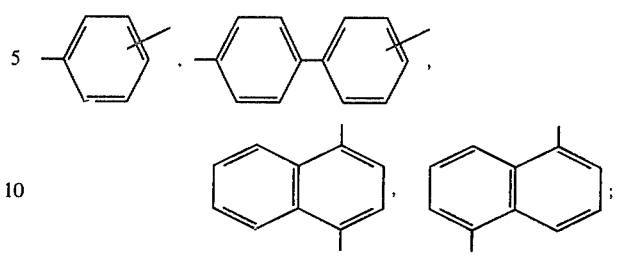

the arylene group Ar$_2$ may be substituted by an alkyl group having 1 to 5 carbon atoms, or a chlorine or a bromine atom; the number of substituents being in the range of from zero to the number of hydrogen atoms by which Ar$_2$ can be substituted.

4. The resin composition according to claim 1, wherein the aromatic dicarboxylic acid and/or a derivative thereof is a mixture of a terephthalic acid or a derivative thereof, and isophthalic acid or a derivative thereof.

5. The resin composition according to claim 4, wherein the terephthalic acid or a derivative thereof is mixed with the isophthalic acid or a derivative thereof at a molar ratio of from about 9:1 to about 1:9.

6. The resin composition according to claim 4, wherein the terephthalic acid or a derivative thereof is mixed with the isophthalic acid or a derivative thereof at a molar ratio of from 7:3 to 3:7.

7. The resin composition according to claim 4, wherein the terephthalic acid or a derivative thereof is mixed with the isophthalic acid or a derivative thereof at a molar ratio of 5:5.

8. The resin composition according to claim 1, wherein said diphenol or a derivative thereof is 2,2-bis(4-hydroxyphenyl)propane or a derivative thereof and said aromatic dicarboxylic acid or a derivative thereof is a mixture of terephthalic acid or a derivative thereof and isophthalic acid or a derivative thereof.

9. The resin composition according to claim 1, wherein said polyamide is polycaprolactam or polyhexamethylenediamine.

10. The resin composition according to claim 1, wherein the proportion by weight of the component (A) to component (B) ranges from about 1:9 to about 9:1.

11. The resin composition according to claim 1, wherein the proportion by weight of the component (A) to component (B) ranges from 3:7 to 7:3.

12. The resin composition according to claim 1, wherein the component (A) contains from about 0.5 to about 20% of acid anhydride linkages.

13. The resin composition according to claim 1, wherein the component (A) contains from 1 to 10% of acid anhydride linkages.

14. The resin composition according to claim 1, which contains more than about 50% by weight of the component (B) and comprises islands of the component (A) being dispersed in a sea of the component (B) in substantially spherical particles having an average size of from about 0.2 to about 2 microns.

15. The resin composition according to claim 1, which has been mixed in a molten state at a temperature in the range of from about 180° to about 340° C. and for a period in the range of from about 1 second to about 60 minutes.

16. The resin composition according to claim 1, which additionally comprises a polymeric material.

17. The resin composition according to claim 16, which additionally comprises a rubber.

18. A molded article produced from the resin composition of claim 1.

19. The resin composition of claim 1, wherein said composition possesses a logarithmic viscosity number of about 0.3 to 1.5.

20. The resin composition of claim 1 prepared by initially reacting an excess amount of aromatic dicarboxylic acid or derivative thereof with the diphenol.

21. The resin composition of claim 1 prepared by a two-stage reaction, in the first stage of which an excess amount of aromatic dicarboxylic acid or derivative thereof is reacted with diphenol, and in the second stage of which the balance of the diphenol is reacted.

22. The resin composition of claim 21, where in the first stage the molar ratio of aromatic dicarboxylic acid or derivative thereof to diphenol is about 1:0.1 to 1:0.98 and in the second stage the molar ratio of aromatic dicarboxylic acid or derivative thereof to diphenol is about 1:1 to 1:1.5.

* * * * *

UNITED STATES PATENT AND TRADEMARK OFFICE
CERTIFICATE OF CORRECTION

PATENT NO. : 4,258,154
DATED : March 24, 1981
INVENTOR(S) : KAYOMON KYO ET AL

It is certified that error appears in the above—identified patent and that said Letters Patent is hereby corrected as shown below:

Col. 18, Claim 1, line 44, after "and" delete "f".

Signed and Sealed this

Twenty-ninth Day of September 1981

[SEAL]

Attest:

GERALD J. MOSSINGHOFF

Attesting Officer     Commissioner of Patents and Trademarks